United States Patent
Hwang

(10) Patent No.: US 11,581,540 B2
(45) Date of Patent: Feb. 14, 2023

(54) NEGATIVE ELECTRODE ACTIVE MATERIAL FOR RECHARGEABLE LITHIUM BATTERY, METHOD FOR PREPARING THE SAME, AND NEGATIVE ELECTRODE AND RECHARGEABLE LITHIUM BATTERY INCLUDING SAME

(71) Applicant: Samsung SDI Co., Ltd., Yongin-si (KR)

(72) Inventor: Cheol-Hee Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 372 days.

(21) Appl. No.: 16/822,836

(22) Filed: Mar. 18, 2020

(65) Prior Publication Data

US 2020/0227748 A1  Jul. 16, 2020

Related U.S. Application Data

(62) Division of application No. 15/226,626, filed on Aug. 2, 2016, now Pat. No. 10,615,415.

(30) Foreign Application Priority Data

Aug. 27, 2015  (KR) .......................... 10-2015-0121121

(51) Int. Cl.
*H01M 4/133* (2010.01)
*H01M 4/583* (2010.01)
*H01M 4/587* (2010.01)
*H01M 4/36* (2006.01)
(Continued)

(52) U.S. Cl.
CPC ............ *H01M 4/587* (2013.01); *H01M 4/133* (2013.01); *H01M 4/134* (2013.01); *H01M 4/364* (2013.01); *H01M 10/0525* (2013.01)

(58) Field of Classification Search
None
See application file for complete search history.

(56) References Cited

U.S. PATENT DOCUMENTS 5,700,298 A * 12/1997 Shi .................... H01M 4/587
429/232
6,479,192 B1  11/2002 Chung et al.
(Continued)

FOREIGN PATENT DOCUMENTS

JP  2002-110157 A  4/2002
KR  10-2012-0129880 A  11/2012
(Continued)

OTHER PUBLICATIONS

Office Action dated Feb. 22, 2022 of the corresponding Korean Patent Application No. 10-2015-0121121, 7pp.

*Primary Examiner* — Yoshitoshi Takeuchi
(74) *Attorney, Agent, or Firm* — Lewis Roca Rothgerber Christie LLP

(57) ABSTRACT

A negative active material for a rechargeable lithium battery includes a carbon-based active material including highly crystalline natural graphite and artificial graphite. The carbon-based active material has a peak intensity ratio (P2/P4) of about 0.3 to about 0.4, wherein P2 refers to the 101 peak of a rhombohedral crystal grain and P4 refers to the 101 peak of a hexagonal crystal grain, as measured by X-ray diffraction.

7 Claims, 7 Drawing Sheets

(51) Int. Cl.
*H01M 4/134* (2010.01)
*H01M 10/0525* (2010.01)

(56) References Cited

U.S. PATENT DOCUMENTS

| | | | |
|---|---|---|---|
| 2006/0172201 A1 * | 8/2006 | Yasukawa | H01M 4/133 |
| | | | 429/329 |
| 2013/0140488 A1 | 6/2013 | Sotowa et al. | |
| 2013/0164618 A1 | 6/2013 | Konishi | |
| 2013/0330620 A1 | 12/2013 | Nishimura et al. | |
| 2014/0349180 A1 | 11/2014 | Kim et al. | |

FOREIGN PATENT DOCUMENTS

| | | |
|---|---|---|
| KR | 10-2013-0041227 A | 4/2013 |
| KR | 10-2013-0061566 A | 6/2013 |
| KR | 10-2013-0100044 A | 9/2013 |
| KR | 10-2014-0139294 A | 12/2014 |

* cited by examiner

NEGATIVE ELECTRODE ACTIVE MATERIAL FOR RECHARGEABLE LITHIUM BATTERY, METHOD FOR PREPARING THE SAME, AND NEGATIVE ELECTRODE AND RECHARGEABLE LITHIUM BATTERY INCLUDING SAME

CROSS-REFERENCE TO RELATED APPLICATIONS

This application is a divisional of U.S. patent application Ser. No. 15/226,626, filed Aug. 2, 2016, which claims priority to and the benefit of Korean Patent Application No. 10-2015-0121121, filed on Aug. 27, 2015 in the Korean Intellectual Property Office, the entire content of which is incorporated herein by reference.

BACKGROUND

1. Field

One or more aspects of embodiments of the present disclosure relate to a negative active material for a rechargeable lithium battery, a method of preparing the same, a negative electrode including the same, and a rechargeable lithium battery including the same.

2. Description of the Related Art

Rechargeable lithium batteries have recently drawn attention as power sources for small portable electronic devices. Rechargeable lithium batteries use an organic electrolyte solution, and thereby have discharge voltages that are twice as high as batteries that use alkali aqueous electrolyte solutions. Accordingly, rechargeable lithium batteries have high energy densities.

Rechargeable lithium batteries may be manufactured by injecting an electrolyte into a battery cell including a positive electrode having a positive active material that can intercalate and deintercalate lithium, and a negative electrode having a negative active material that can intercalate and deintercalate lithium.

SUMMARY

One or more aspects of embodiments of the present disclosure provide a rechargeable lithium battery having improved electrolyte impregnation properties and thermal stability, as well as a high density active material electrode.

One or more aspects of embodiments of the present disclosure provide a negative active material for a rechargeable lithium battery that includes a carbon-based active material including highly crystalline natural graphite and artificial graphite, wherein the carbon-based active material has a peak intensity ratio (P2/P4) of about 0.3 to about 0.4, wherein P2 refers to the (101) peak intensity of a rhombohedral crystal grain and P4 refers to the (101) peak intensity of a hexagonal crystal grain, as measured by X-ray diffraction (XRD).

The carbon-based active material may have a peak intensity ratio (P2/P1) of about 0.43 to about 0.55, wherein P2 refers to the (101) peak intensity of a rhombohedral crystal grain and P1 refers to the (100) peak intensity of a hexagonal crystal grain.

The carbon-based active material may have a peak intensity ratio (P3/P4) of about 0.18 to about 0.26, where P3 refers to the (012) peak intensity of a rhombohedral crystal grain and P1 refers to the (101) peak intensity of a hexagonal crystal grain.

The carbon-based active material may have a Raman R value $(I_D/I_G)$ of $0.21 \leq I_D/I_G \leq 0.24$.

The carbon-based active material may include the highly crystalline natural graphite and the artificial graphite in a weight ratio of about 10:90 to about 50:50.

The highly crystalline natural graphite may have a Raman R value $(I_D/I_G)$ of $0.05 \leq I_D/I_G \leq 0.08$.

The highly crystalline natural graphite may have a $d_{002}$ value of $3.360 < d_{002}$ (Å) $< 3.365$.

The negative active material for a rechargeable lithium battery may further include a silicon-based active material.

The silicon-based active material may be present in an amount of about 0.05 wt % to about 5 wt % based on the total amount of the negative active material in a rechargeable lithium battery.

One or more embodiments of the present disclosure are directed toward a rechargeable lithium battery including a current collector; a negative electrode including the negative active material; a positive electrode; and an electrolyte.

The negative electrode may have an active material density of greater than or equal to about 1.7 g/cc.

Other embodiments are included in the following detailed description.

A rechargeable lithium battery cell having high active material density, improved electrolyte impregnation properties, and thermal stability may be realized.

DETAILED DESCRIPTION

Figure 1:
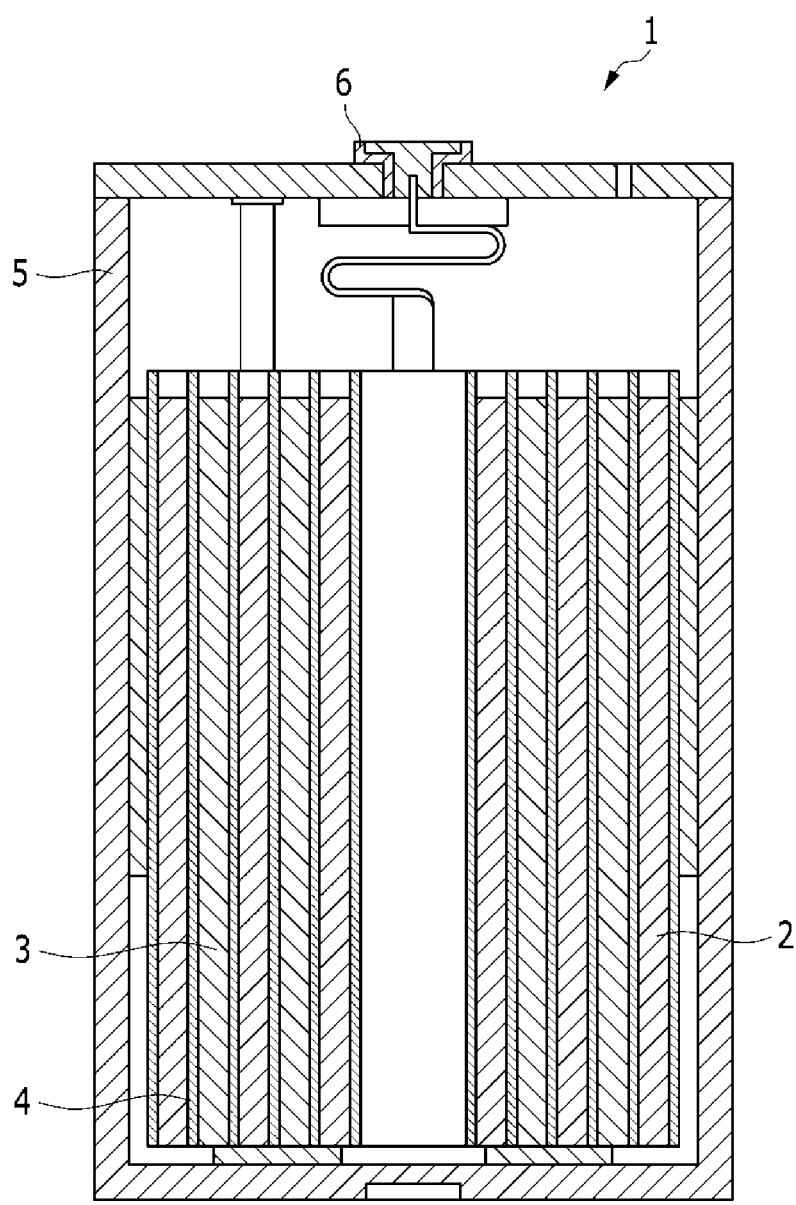
FIG. 1 is an cross-sectional view showing a rechargeable lithium battery according to one embodiment.

Hereinafter, embodiments of the present disclosure will be described in more detail with reference to the accompanying drawings, in which example embodiments of the disclosure are shown. As those skilled in the art would realize, the described embodiments may be modified in various ways, all without departing from the spirit or scope of the present disclosure.

In the drawings, the thickness of layers, films, panels, regions, etc., may be exaggerated for clarity. Like reference numerals designate like elements throughout the specification, and duplicative descriptions thereof may not be provided. It will be understood that when an element such as a layer, film, region, or substrate is referred to as being "on" another element, it can be directly on the other element or intervening elements may also be present. In contrast, when an element is referred to as being "directly on" another element, no intervening elements are present.

A negative active material for a rechargeable lithium battery according to one or more embodiments of the present disclosure includes a carbon-based active material including highly crystalline natural graphite and artificial graphite. As used herein, "highly crystalline" may refer to a state in which the larger portion of molecules in a material are arranged in grains of a regular repeating three-dimensional structure.

As for negative active materials, various carbon-based materials such as artificial graphite, natural graphite, hard carbon and the like have been used. Recently, non-carbon-based negative active materials such as silicon (Si) have been researched, in accordance with the need for stable and high-capacity batteries.

The carbon-based active material may have a peak intensity ratio (P2/P4) of about 0.3 to about 0.4, where P2 refers to the (101) peak intensity of a rhombohedral crystal grain and P4 refers to the (101) peak intensity of a hexagonal crystal grain when analyzed via X-ray diffraction.

When the ratio of the (101) peak intensity of a rhombohedral crystal grain (P2) relative to the (101) peak intensity of a hexagonal crystal grain (P4) is within this range, as measured from the XRD diffraction pattern collected with CuKα radiation, the hexagonal crystals and the rhombohedral crystals are appropriately or suitably mixed, and may thus secure an impregnation path for an electrolyte solution even in an electrode having a high active material density. Thus, a rechargeable lithium battery having excellent cycle-life characteristics may be realized.

The carbon-based active material may have a ratio (P2/P1) of about 0.43 to about 0.55, where P2 refers to the (101) peak intensity of a rhombohedral crystal grain and P1 refers to the (100) peak intensity of a hexagonal crystal grain. The carbon-based active material may also have a ratio (P3/P4) of about 0.18 to about 0.26, where P3 refers to the (012) peak intensity of a rhombohedral crystal grain and P4 refers to the (101) peak intensity of a hexagonal crystal grain.

Figure 2:
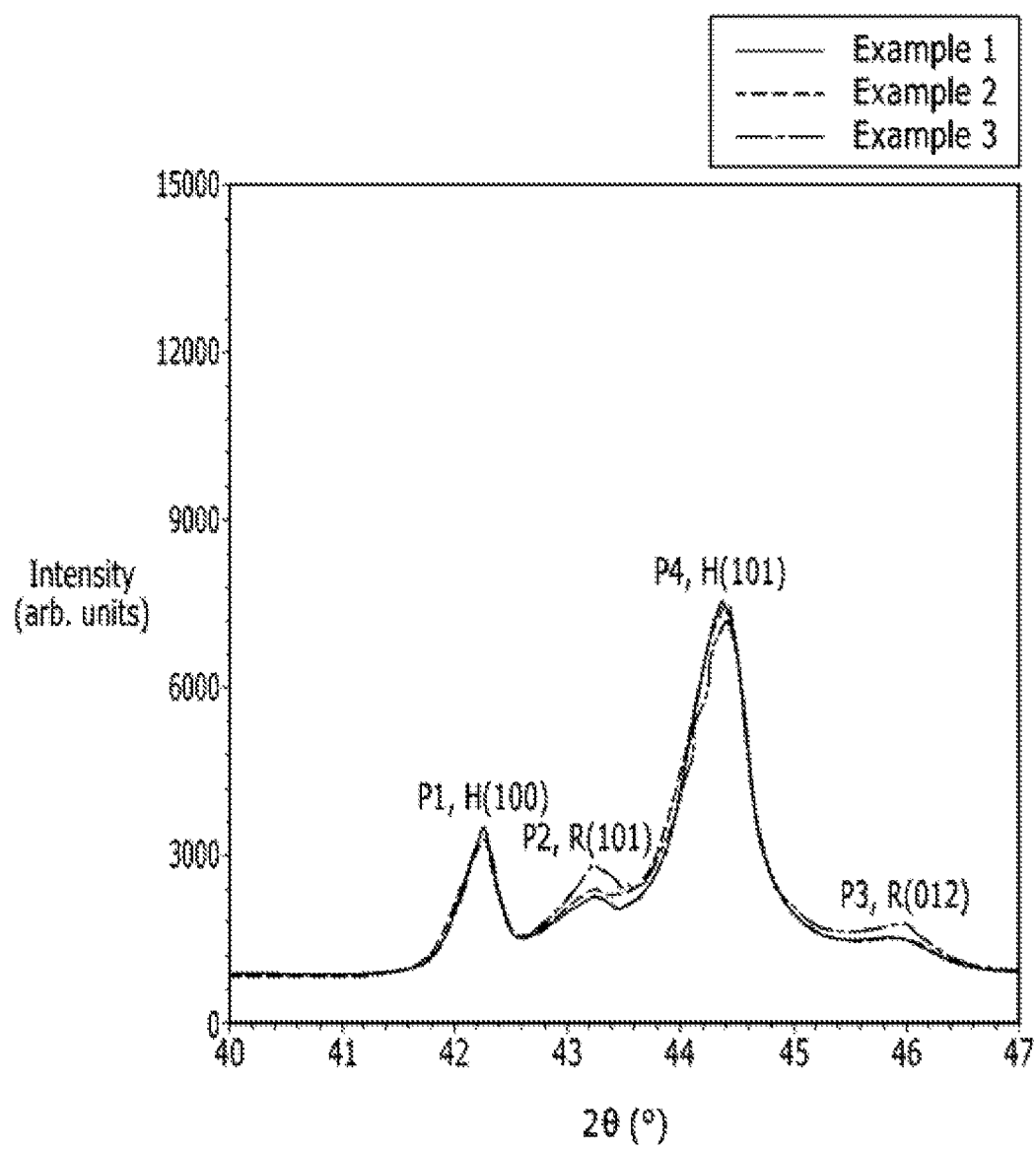
FIG. 2 is a graph showing an XRD analysis of negative active material according to one or more embodiments.

In FIG. 2, the (101) peak intensity of the hexagonal crystal grain (P4) is marked as H(101), while the (101) peak intensity of the rhombohedral crystal grain (P2) is marked as R(101). The (100) peak intensity of the hexagonal crystal grain (P1) is marked as H(100), while the (012) peak intensity of the rhombohedral crystal grain (P3) is marked as R(012).

The carbon-based active material may have a Raman R value ($I_D/I_G$) of $0.21 \leq I_D/I_G \leq 0.24$.

As used herein, $I_G$ may indicate a peak arising from a crystalline region (e.g., G-peak, a peak around 1580 cm$^{-1}$), while $I_D$ may indicate a peak arising from an amorphous region (e.g., D-peak, a peak around 1360 cm$^{-1}$), and the Raman R value may be defined as $I_D/I_G$. When the Raman R value is larger, the carbon-based active material may have lower crystallinity.

When the carbon-based active material has a Raman R value within the aforementioned range, a high density electrode plate may be realized, and the cycle-life characteristics of a battery may be improved. When the Raman R value is less than about 0.21, the battery capacity may be deteriorated or decreased due to deterioration or decrease of its charge and discharge efficiency. However, when the Raman R value is greater than about 0.24, the swelling characteristics of a cell may become problematic during extended cycling, and thus the cell may become thick.

The carbon-based active material may include highly crystalline natural graphite and artificial graphite in a weight ratio of about 10:90 to about 50:50.

When the highly crystalline natural graphite is present in a ratio (e.g., an amount) of less than about 10 wt %, a stable high density negative electrode is difficult to manufacture, and the initial increase in battery capacity may be lost due to deterioration or decrease in charge/discharge efficiency during initial cycling. When the highly crystalline natural graphite is present in a ratio (e.g., an amount) of more than about 50 wt %, the battery capacity may be increased, but the ability to suppress battery swelling during long-term cycling may be deteriorated or reduced.

In one or more embodiments, the highly crystalline natural graphite and the artificial graphite may be mixed in (or to) a weight ratio of about 10:90, about 20:80, and/or about 50:50, but embodiments of the present disclosure are not limited thereto.

The highly crystalline natural graphite included in the carbon-based active material according to one embodiment of the present disclosure may have crystal characteristics that are different from those of general natural graphite, and may show crystal characteristics that are similar or close to those of artificial graphite.

In one or more embodiments, the highly crystalline natural graphite may have a Raman R value ($I_D/I_G$) of about $0.05 \leq I_D/I_G \leq 0.08$, and $d_{002}$ may be about $3.360 < d_{002}$ (Å) $< 3.365$.

As used herein, $d_{002}$ may indicate the distance between (002) plane layers in a XRD diffraction pattern obtained using CuKα radiation, and may be used as an indicator of the crystallinity of the carbon-based particles along with the Raman R value.

According to one or more embodiments of the present disclosure, the highly crystalline natural graphite included in a negative active material for a rechargeable lithium battery differs from general natural graphite. It is manufactured via additionally continuous (e.g., substantially continuous) heat treatment at a high temperature and pressure, and thus may have appropriate or suitable crystallinity and pore characteristics. For example, general natural graphite is manufactured through a pitch coating process, but spherical natural graphite is manufactured through a surface oxidation process, and may secure crystallinity close to that of artificial graphite due to a capacity and efficiency increase according to removal of defected carbon (e.g., due to an increase in the capacity and efficiency of carbon defect removal) and an irreversibility decrease according to an —OHC═O decrease by oxidization (e.g., an irreversible decrease in the presence of —OH and C═O groups from oxidization). When the negative active material includes natural graphite having these crystal characteristics, the thermal stability of the battery and the impregnation characteristics of the electrolyte solution may be improved.

In some embodiments, the rechargeable lithium battery including the highly crystalline natural graphite may have the beneficial features or characteristics of natural graphite in a high density active material electrode, and may thus provide high capacity as well as high energy density due to the high density electrode.

Artificial graphite has excellent orientation characteristics. When mixed with the highly crystalline natural graphite in an appropriate or suitable ratio, a rechargeable lithium battery having concurrently (e.g., simultaneously) improved cycle-life characteristics and battery capacity may be realized.

In one or more embodiments, the artificial graphite of the carbon-based active material may have a peak intensity ratio of about 0.62 to about 0.64, as calculated for the (101) peak intensity of a rhombohedral crystal grain relative to the (100) peak intensity of a hexagonal crystal grain.

The negative active material for a rechargeable lithium battery may further include a silicon-based active material. When the negative active material further includes a silicon-based active material, a high capacity lithium battery may be realized.

The silicon-based active material may be present in an amount of about 0.05 wt % to about 5 wt % based on the total amount of the negative active material for a rechargeable lithium battery. When the silicon-based active material is included in an amount of less than about 0.05 wt %, the improvement in battery capacity may be deteriorated or diminished; when the silicon-based active material is included in an amount greater than about 5 wt %, the effect of suppressing battery swelling may be deteriorated or diminished due to electrode expansion caused by the increased amount of silicon.

In some embodiments, the silicon-based active material may be included in an amount of about 0.05 wt % to about 3.5 wt % and in some embodiments, about 0.05 wt % to about 1 wt %, but embodiments of the present disclosure are not limited thereto and the amounts may be adjusted, depending on desired capacity.

The silicon-based active material may be a material selected from Si, $SiO_x$ (0<x<2), a Si—Z alloy (wherein Z may be selected from an alkali metal, an alkaline-earth metal, a Group 13 element, a Group 14 element excluding Si, a transition metal, a rare earth element, and/or a combination thereof), and a combination thereof. As used herein, the terms "combination", "combination thereof", and "combinations thereof" may refer to a chemical combination (e.g., an alloy or chemical compound), a mixture, or a laminated structure of components.

Hereinafter, a rechargeable lithium battery including the negative active material will be described with reference to FIG. 1.

FIG. 1 is a cross-sectional view showing a rechargeable lithium battery according to an embodiment of the present disclosure.

Referring to FIG. 1, the rechargeable lithium battery 1 is a prismatic battery that includes an electrode assembly including a positive electrode 2, a negative electrode 3, and a separator 4 between the positive electrode 2 and the negative electrode 3 in a battery case 5, an electrolyte solution injected through the upper part of the battery case, and a cap plate 6 for sealing the battery. The rechargeable lithium battery is not limited to a prismatic shape, but may, for example, have a cylindrical, coin-type (e.g., coin), or pouch shape as long as the rechargeable lithium battery including the negative active material for a rechargeable lithium battery can be suitably operated.

In one or more embodiments, a rechargeable lithium battery includes a current collector; a negative electrode including a negative active material; a positive electrode; and an electrolyte.

The negative active material may be the same as described above.

The negative electrode may have an active material density greater than or equal to about 1.7 g/cc.

The negative electrode may have an active material density greater than or equal to about 1.7 g/cc, and in some embodiments about 1.7 g/cc to about 1.8 g/cc, and in some embodiments about 1.7 g/cc to about 1.72 g/cc. Since the energy density of the negative electrode may be increased due to the high density of the active material, the capacity characteristics of the battery may be improved.

The active material density of an electrode may be obtained by dividing the total mass of components excluding the current collector (e.g., the active material, conductive material, binder, and/or the like) by the total volume, and is reported in units of g/cc. In general, although excellent battery capacity may be obtained when the electrode has a higher active material density, the cycle-life characteristics of the electrode may be deteriorated.

However, in one or more example embodiments, the negative active material for a rechargeable lithium battery includes a mixture of the artificial graphite having excellent orientation and the highly crystalline natural graphite, and may exhibit excellent battery capacity without a deterioration in cycle-life.

In other words, the negative active material for a rechargeable lithium battery may include a novel carbon-based active material including highly crystalline natural graphite and artificial graphite, and may exhibit improved or increased thermal stability and cycle-life characteristics as well as facilitate the use of high density active material electrodes.

The current collector material may be selected from a copper foil, a nickel foil, a stainless steel foil, a titanium foil, a nickel foam, a copper foam, a polymer substrate coated with a conductive metal, and a combination thereof, but embodiments of the present disclosure are not limited thereto.

The negative electrode may include a layer of negative active material on the current collector, and the layer of negative active material may further include a binder, a conductive material and/or a thickener in addition to the negative active material.

The negative active material may be the same as described above.

The binder may improve the binding properties of the negative active material particles with one another and with a current collector. Non-limiting examples of the binder material may include polyvinyl alcohol, carboxymethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride (PVdF), polyethylene (PE), polypropylene, a styrene-butadiene rubber, an acrylated styrene-butadiene rubber, an epoxy resin, nylon, and the like.

The conductive material may improve the electrical conductivity of the electrode. Any electrically conductive material may be used as a conductive material, unless it causes a chemical change (e.g., an undesirable change in the fabricated battery). Non-limiting examples of the conductive material may include a carbon-based material (e.g., natural graphite, artificial graphite, carbon black, acetylene black, Ketjenblack, carbon fiber, and/or the like); a metal-based material (e.g., copper (Cu), nickel (Ni), aluminum (Al), silver (Ag), and/or the like in the form of metal powder, metal fiber, and/or the like); a conductive polymer (e.g., a polyphenylene derivative and/or the like); and/or a mixture thereof.

The thickener may be an additive for increasing the viscosity of the negative active material slurry, and may be, for example, carboxyl methyl cellulose (CMC), but embodiments of the present disclosure are not limited thereto.

The positive electrode may include a current collector and a positive active material layer formed on the current collector. The positive active material may include lithiated intercalation compounds that reversibly intercalate and deintercalate lithium ions. In one or more embodiments, at least one composite oxide of lithium and a metal of cobalt, manganese, nickel, or a combination thereof may be used. Non-limiting examples thereof may include a compound represented by one of the following chemical formulae:

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.05, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤10.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$.

In Chemical Formulae, A may be selected from nickel (Ni), cobalt (Co), manganese (Mn), and a combination thereof; X may be selected from aluminum (Al), Ni, Co, Mn, chromium (Cr), iron (Fe), magnesium (Mg), strontium (Sr), vanadium (V), a rare earth element, and a combination thereof; D may be selected from oxygen (O), fluorine (F), sulfur (S), phosphorus (P), and a combination thereof; E may be selected from Co, Mn, and a combination thereof; T may be selected from F, S, P, and a combination thereof; G may be selected from Al, Cr, Mn, Fe, Mg, lanthanum (La), cerium (Ce), Sr, V, and a combination thereof; Q may be selected from titanium (Ti), molybdenum (Mo), Mn, and a combination thereof; Z may be selected from Cr, V, Fe, Sc, yttrium (Y), and a combination thereof; and J may be selected from V, Cr, Mn, Co, Ni, copper (Cu), and combination thereof.

This compound may have a coating layer on its surface or may be mixed with another compound having the coating layer. This coating layer may include at least one coating element compound selected from an oxide of a coating element, a hydroxide of the coating element, an oxyhydroxide of the coating element, an oxycarbonate of the coating element, and a hydroxycarbonate of the coating element. The compound for forming the coating layer may be amorphous or crystalline. The coating element included in the coating layer may be selected from Mg, Al, Co, potassium (K), sodium (Na), calcium (Ca), silicon (Si), Ti, V, tin (Sn), germanium (Ge), gallium (Ga), boron (B), astatine (As), zirconium (Zr), and a mixture thereof. The coating layer may be formed using any suitable method having no negative influence on the positive active material (e.g., spray coating, dipping, and/or the like). Such methods will be easily understood by those who have knowledge in the related art and are not illustrated in more detail.

The positive active material may be included in an amount of about 80 to about 99 wt % based on the total amount of material in the positive active material layer. The positive active material layer may also include a binder and a conductive material. Herein, the binder and the conductive material may be respectively used in amounts of about 1 to about 5 wt % based on the total amount of the positive active material layer.

The binder may improve the binding properties of the positive active material particles with one another and with a current collector. Non-limiting examples thereof may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may improve the conductivity of the electrode. Any electrically conductive material may be used as a conductive material unless it causes a chemical change (e.g., an undesirable change in the fabricated battery). Non-limiting examples of the conductive material may include one or more of natural graphite, artificial graphite, carbon black (e.g., acetylene black, and/or Ketjenblack), a carbon fiber, a metal powder, or a metal fiber of copper, nickel, aluminum, silver, and the like, and a polyphenylene derivative and the like.

The electrolyte may include a non-aqueous organic solvent and a lithium salt.

The non-aqueous organic solvent may serve as a medium for transmitting the ions taking part in the electrochemical reaction of a battery.

The organic solvent may include one or more solvents selected from a carbonate-based solvent, an ester-based solvent, an ether-based solvent, a ketone-based solvent, an alcohol-based solvent, and an aprotic solvent. The carbonate based solvent may include, for example dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like, and the ester-based solvent may include, for example, methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. The ester-based solvent may include, for example, dibutyl ether, tetraglyme, diglyme, dimethoxyethane, 2-methyltetrahydrofuran, tetrahydrofuran, and the like, and the ketone-based solvent may include, for example, cyclohexanone and the like. The alcohol-based solvent may include, for example, ethanol, isopropyl alcohol, and the like, and the aprotic solvent may include nitriles such as R—CN (wherein R is a $C_2$ to $C_{20}$ linear, branched, or cyclic hydrocarbon group, and may include a double bond, an aromatic ring, or an ether bond), amides such as dimethylformamide, dioxolanes such as 1,3-dioxolane, sulfolanes, and the like.

The non-aqueous organic solvent may be used singularly or in a mixture. When the organic solvent is used in a mixture, the mixture ratio may be chosen according to the desired or suitable battery performance.

The carbonate-based solvent may be prepared by mixing a cyclic carbonate and a linear carbonate. The cyclic carbonate and the linear carbonate may be mixed together in (or to) a volume ratio of about 1:1 to about 1:9. When the volume ratio is within this range, the performance of the electrolyte may be improved.

The non-aqueous organic electrolyte may be further prepared by mixing a carbonate-based solvent with an aromatic hydrocarbon-based solvent. The carbonate-based solvents and the aromatic hydrocarbon-based solvents may be mixed together in (or to) a volume ratio of about 1:1 to about 30:1.

The aromatic hydrocarbon-based organic solvent may be an aromatic hydrocarbon-based compound represented by Chemical Formula 1:

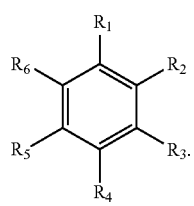

Chemical Formula 1

In Chemical Formula 1, $R_1$ to $R_6$ may each independently be selected from hydrogen, a halogen, a $C_1$ to $C_{10}$ alkyl group, a $C_1$ to $C_{10}$ haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include vinylene carbonate or an ethylene carbonate-based compound represented by Chemical Formula 2 in order to improve battery cycle-life:

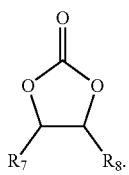

Chemical Formula 2

In Chemical Formula 2, $R_7$ and $R_8$ may each independently be selected from hydrogen, a halogen, a cyano group (CN), a nitro group ($NO_2$) or a $C_1$ to $C_5$ fluoroalkyl group, provided that at least one of the $R_7$ and $R_8$ is a halogen, a cyano group (CN), a nitro group ($NO_2$) or a $C_1$ to $C_5$ fluoroalkyl group.

Non-limiting examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the vinylene carbonate or the ethylene carbonate-based compound used to improve cycle life may be adjusted within an appropriate or suitable range.

The lithium salt may be dissolved in an organic solvent, and may supply lithium ions in a battery. The lithium salt may facilitate basic operation of the rechargeable lithium battery, and may improve lithium ion transport between the positive and negative electrodes therein. Non-limiting examples of the lithium salt may include at least one supporting salt of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein x and y are natural numbers, LiCl, LiI, $LiB(C_2O_4)_2$ (e.g., lithium bis(oxalato) borate; LiBOB), and/or a combination thereof. The lithium salt may be used in a concentration of about 0.1 M to about 2.0 M. When the lithium salt is included at a concentration within the above range, the electrolyte may have excellent lithium ion mobility and performance due to optimal or suitable electrolyte conductivity and viscosity.

The separator 113 may include any material commonly used in lithium batteries, as long as it is able to suitably separate the negative electrode 112 from the positive electrode 114 and provide a transporting passage for lithium ions. In other words, the separator may have a low ion transport resistance and excellent electrolyte solution impregnation characteristics. The separator material may be selected from, for example, glass fiber, polyester, TEFLON® (e.g., polytetrafluoroethylene, PTFE), polyethylene, polypropylene, and/or a combination thereof. It may be formed as a non-woven fabric or a woven fabric. For example, a polyolefin-based polymer separator such as polyethylene, polypropylene, or the like is commonly used in lithium ion batteries. A coated separator including a ceramic or polymer component may be used to increase the heat resistance and/or mechanical strength of the separator. The separator may have a mono-layered or multi-layered structure.

Hereinafter, a method of manufacturing one or more example embodiments of the negative active material will be illustrated in more detail.

First, natural graphite is processed into a sphere, preparing a spherically-shaped natural graphite.

The spherically-shaped natural graphite is heat-treated and pressure-treated, preparing highly crystalline natural graphite.

The heat treatment may be performed at about 600° C. to about 700° C. for about 8 to about 16 hours, and in some embodiments, at about 620° C. to about 650° C. for about 8 to about 12 hours. The method of manufacturing the highly crystalline natural graphite according to an example embodiment does not include a pitch coating process and thus may prevent or reduce graphitization under high pressure conditions. In other words, the method maintains high crystallinity and thus may be used to realize excellent electrolyte solution impregnation, thereby improve the cycle-life characteristics.

The highly crystalline natural graphite may be pressure-treated after the heat treatment.

The pressure treatment may be performed at a pressure of about 20 to about 120 MPa and in some embodiments, at about 50 to about 100 MPa. Before the pressure treatment, a plurality of pores may be formed inside the highly crystalline natural graphite, through which an electrolyte solution permeates, causing a continuous irreversible reaction. This irreversible reaction may degrade the cycle-life characteristics of the battery due to a decrease in capacity and a thickness increase (e.g., an increase in the thickness of the battery), and thus, embodiments of the present disclosure improve the characteristics of the battery by decreasing the pores (e.g., by decreasing the size and/or amount of the pores).

In other words, the highly crystalline natural graphite included in a negative active material for a rechargeable lithium battery according to an example embodiment may be formed through continuous (e.g., substantially continuous) heat and pressure treatment and thus may have appropriate or suitable crystallinity and pore characteristics.

The highly crystalline natural graphite may have a Raman R value ($I_D/I_G$) of about $0.05 \leq I_D/I_G \leq$ about 0.08.

The highly crystalline natural graphite may have a $d_{002}$ of about $3.360 < d_{002}$ (Å) $< 3.365$.

The highly crystalline natural graphite may be mixed with artificial graphite.

The mixing of the highly crystalline natural graphite with the artificial graphite may be performed via a mechanical mixing method. For example, the mixing may be performed utilizing a method selected from ball milling, mechanofusion milling, shaker milling, planetary milling, attritor milling, disk milling, shape milling, Nauta milling, Nobilta milling, and/or a combination thereof, but embodiments of the present disclosure are not limited thereto.

The highly crystalline natural graphite and the artificial graphite may be mixed in (or to) a weight ratio of about 10:90 to about 50:50 and in some embodiments, about 20:80 to about 30:70, but embodiments of the present disclosure are not limited thereto.

A silicon-based active material may be further added to the mixture of the highly crystalline natural graphite with the artificial graphite.

The silicon-based active material may be used in an amount of about 0.05 wt % to about 5 wt %, in some embodiments, about 0.05 to about 3.5 wt %, and in some embodiments, about 0.05 to about 1 wt %, but embodiments of the present disclosure are not limited thereto and the amount of silicon-based active material may be adjusted according to the desired or suitable battery capacity.

Hereinafter, aspects of the present disclosure will be illustrated in more detail with reference to example embodiments. However, embodiments of the present disclosure are not limited thereto.

Manufacture of Negative Electrode

Manufacture of Highly Crystalline Natural Graphite

Natural graphite (Raman R value: 0.05, average particle diameter (D50): 17 μm) was treated at 620° C. for 10 hours in a rotary kiln, manufacturing highly crystalline natural graphite.

Example 1

The highly crystalline natural graphite was mixed with artificial graphite in (or to) a weight ratio of 10:90 to obtain a carbon-based active material, and 99 wt % of the carbon-based active material was mixed with 1 wt % of SiOx (0<x<2) to prepare a negative active material, 97.5 wt % of the negative active material, 1.5 wt % of styrene-butadiene rubber as a binder, and 1 wt % of carboxymethyl cellulose as a thickener were mixed and then dispersed into water to prepare a negative active material slurry. Subsequently, the negative active material slurry was coated on a copper foil via a slot die method to form a negative active material layer, and the negative active material layer was dried at 80° C.

Subsequently, the copper foil coated with the negative active material layer was pushed into a compression roll and pressed therein, and the compression roll was adjusted to have a compression density of about 1.75 g/cc.

The compressed negative active material layer was secondarily dried at about 140° C. under vacuum, forming a negative electrode.

Example 2

A negative electrode was manufactured according to substantially the same method as in Example 1, except for mixing the highly crystalline natural graphite and the artificial graphite in (or to) a weight ratio of 20:80.

Example 3

A negative electrode was manufactured according to substantially the same method as in Example 1, except for mixing the highly crystalline natural graphite and the artificial graphite in (or to) a weight ratio of 50:50.

Comparative Example 1

A negative electrode was manufactured according to substantially the same method as in Example 1, except for mixing the highly crystalline natural graphite and the artificial graphite in (or to) a weight ratio of 80:20.

Comparative Example 2

A negative electrode was manufactured according to substantially the same method as in Example 1, except for preparing a negative active material by mixing 99 wt % of a carbon-based active material comprising the highly crystalline natural graphite and 1 wt % of $SiO_x$ (0<x<2).

Comparative Example 3

A negative electrode was manufactured according to substantially the same method as in Example 1, except for preparing a negative active material by mixing 99 wt % of a carbon-based active material comprising the artificial graphite and 1 wt % of $SiO_x$ (0<x<2).

Evaluation 1: X-Ray Diffraction (XRD) of Highly Crystalline Natural Graphite

The XRD patterns of the negative active materials according to Examples 1 to 3 are provided in FIG. 2. The XRD patterns of the negative active materials according to Comparative Example 3 are provided in FIG. 7.

FIG. 2 shows that as the ratio amount of highly crystalline natural graphite increased, the (101) peak intensity (P2) corresponding to a rhombohedral crystal grain was increased.

Figure 7:
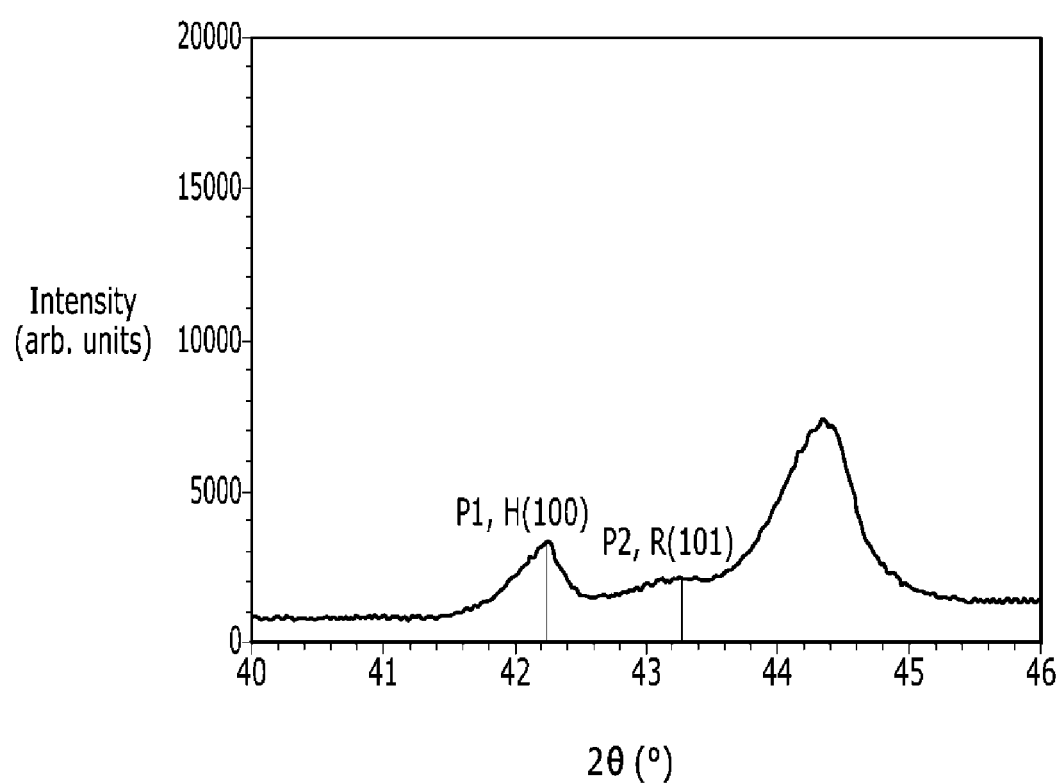
FIG. 7 is a graph showing the XRD analysis of negative active material according to Comparative Example 3.

The increase in (101) peak intensity (P2) of the rhombohedral crystal grain may indicate that battery capacity can be increased by maintaining high active material density in the electrode. As shown in FIG. 7, Comparative Example 3, which does not include the highly crystalline natural graphite, had a (P2/P1) ratio of about 0.62 to 0.64, where P2 is the (101) peak intensity of a rhombohedral crystal grain and P1 is the (100) peak intensity of a hexagonal crystal grain. Comparative Example 3 is thus expected to have an insufficient or lowered capacity improvement effect during initial charge/discharge due to deterioration of efficiency.

Evaluation 2: Impregnation Degree of Electrolyte Solution

The degree to which an electrolyte solution was impregnated into the negative electrodes of Example 1 and Comparative Examples 1 and 2 was evaluated.

The electrolyte solution was prepared using ethylene carbonate (EC)/ethylmethyl carbonate (EMC)/dimethyl carbonate (DMC) mixed at (or to) a ratio of 3/3/4 (v/v/v) and 1.15 M $LiPF_6$.

The impregnation was performed in the following two ways.

The first method was performed by dropping 20 mg of the electrolyte solution on the negative electrodes of Example 1 and Comparative Examples 1 and 2 until the electrolyte solution was completely soaked therein.

The results are provided in Table 1:

TABLE 1

|  | Impregnation time (second) | Impregnation speed (ref = 100%) |
|---|---|---|
| Example 1 | 270 | 1.00 |
| Comparative Example 1 | 360 | 1.33 |
| Comparative Example 2 | 390 | 1.44 |

Referring to Table 1, the negative electrode of Example 1 showed a shorter impregnation time and a higher impregnation speed compared with the negative electrodes of Comparative Examples 1 and 2.

The second method was performed by cutting the negative electrodes of Example 1 and Comparative Examples 1 and 2 to a width of 2 cm, placing them vertically in the electrolyte solution to a depth of 2 mm for 3 minutes, and then measuring the weight change of the negative electrodes to measure the weight of the electrolyte solution adsorbed therein. The evaluation was performed using a Sigma 700 (made by Attention).

The results are provided in Table 2:

TABLE 2

|  | Mass increase (mg) (180 sec) | Impregnation speed (ref = 100%) |
|---|---|---|
| Example 1 | 9.03 | 144 |
| Comparative Example 1 | 8.19 | 131 |
| Comparative Example 2 | 6.98 | 111 |

Referring to Table 2, the negative electrode of Example 1 showed a high mass increase compared with the negative electrodes of Comparative Examples 1 and 2. Accordingly, the negative electrode of Example 1 was more impregnated by the electrolyte solution than the negative electrodes of Comparative Examples 1 and 2.

The two experimental results show that a negative electrode using an active material slurry that includes highly crystalline natural graphite may have a plurality of pores in the negative active material layer that thus provide an impregnation path for an electrolyte solution and resultantly increase the impregnation speed of the electrolyte solution.

Evaluation 3: Thermal Stability

Figure 3:
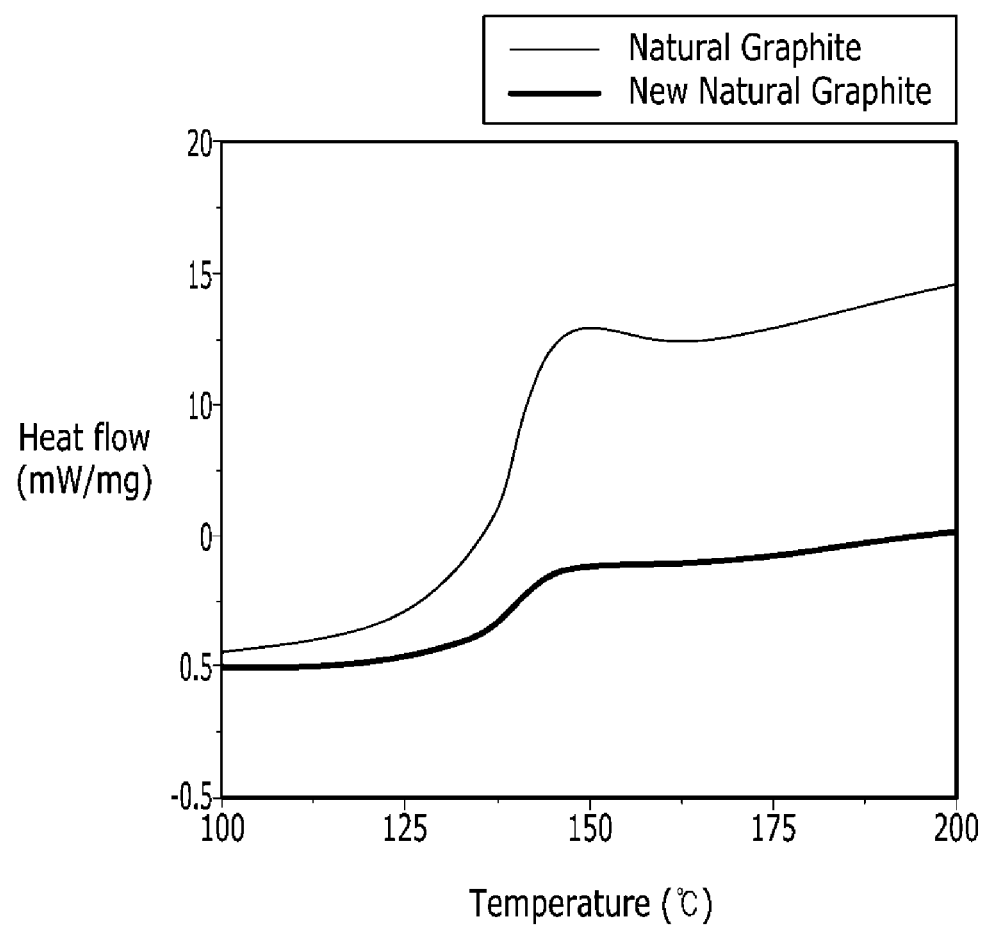
FIG. 3 is a graph showing the heat flow resulting from a temperature change.

The heat flows of highly crystalline natural graphite (New NG) according to Example 1 and pitch-coated natural graphite (NG) were measured by differential scanning calorimetry (DSC) between 100-200° C. at a speed of 10° C./min, and the results are provided in FIG. 3.

FIG. 3 is a graph showing the heat flow of the samples according to the change in temperature.

FIG. 3 shows that highly crystalline natural graphite (New NG), as described in the present disclosure, showed initial characteristics of thermal stability.

Evaluation 4: Cycle-Life Characteristics

A rechargeable lithium battery cell manufactured via a method that should be readily apparent to those of ordinary skill in the art (e.g., using a PVdF-based binder and a PE separator coated with a polymer on both sides) was charged using a constant current-constant voltage (CC/CV) method of 0.7 C to 4.35 V with an ending current of 90 mA, discharged to 3.0 V at a constant current of 0.5 C, and then evaluated regarding cycle-life characteristics. The results are provided in FIGS. 4 to 6.

Figure 4:
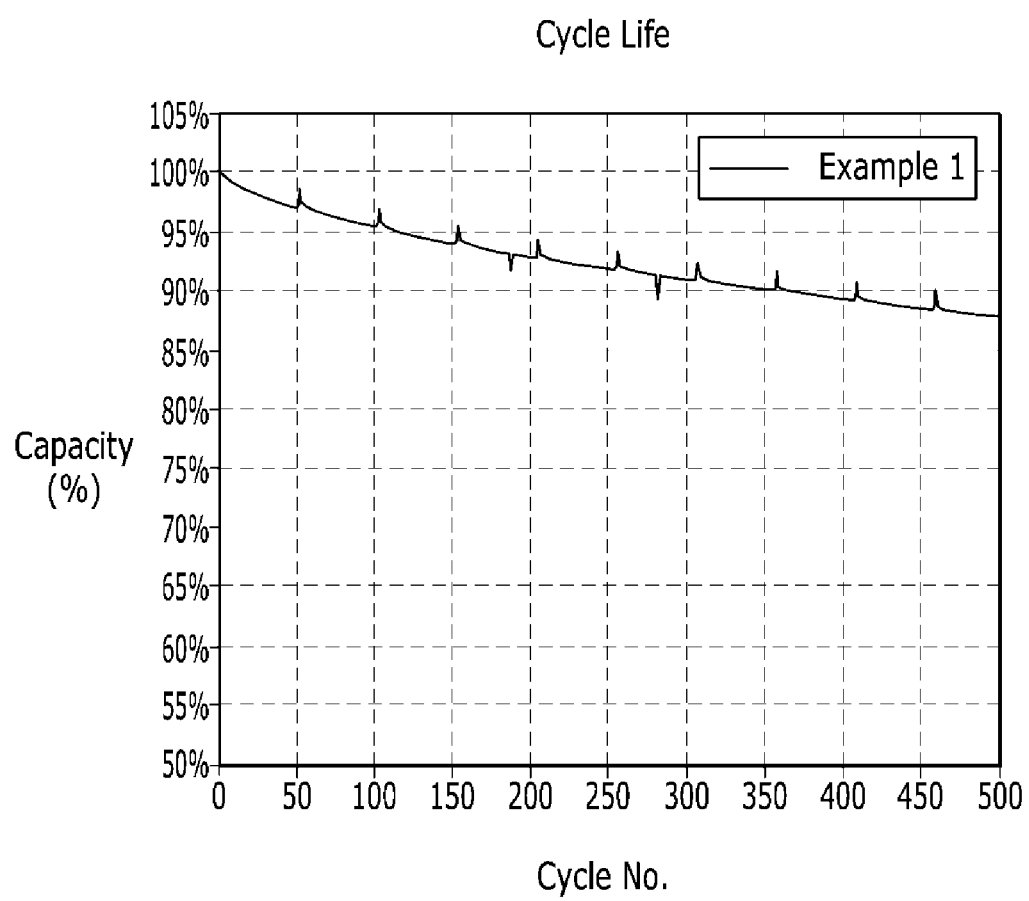
FIG. 4 is a graph showing the cycle-life characteristics of the rechargeable lithium battery cell of Example 1.

FIG. 4 is a graph showing the cycle-life characteristics of the rechargeable lithium battery cell of Example 1.

Figure 5:
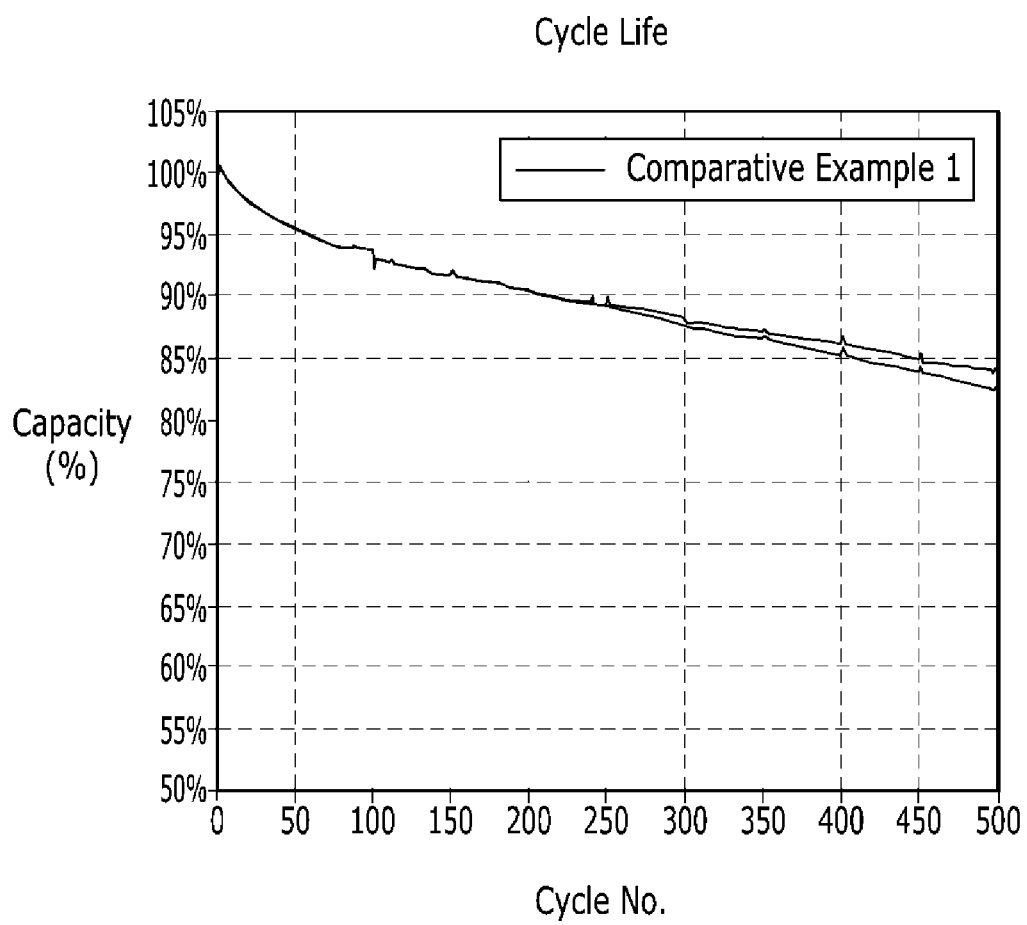
FIG. 5 is a graph showing the cycle-life characteristics of the rechargeable lithium battery cell of Comparative Example 1.

FIG. 5 is a graph showing the cycle-life characteristics of the rechargeable lithium battery cell of Comparative Example 1.

Figure 6:
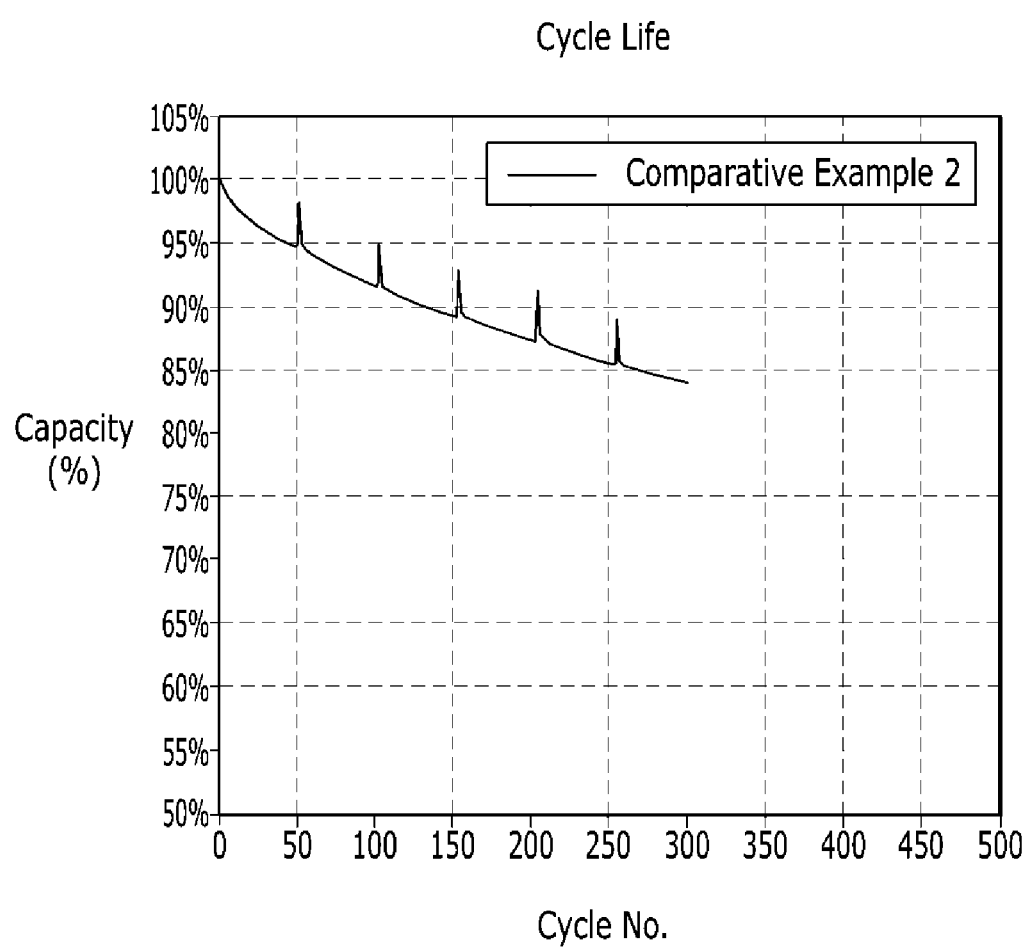
FIG. 6 is a graph showing the cycle-life characteristics of the rechargeable lithium battery cell of Comparative Example 2.

FIG. 6 is a graph showing the cycle-life characteristics of the rechargeable lithium battery cell of Comparative Example 2.

Referring to FIGS. 4 to 6, the rechargeable lithium battery cell of Example 1 maintained about 85 to 90% of its capacity at the 400th cycle and thus showed excellent cycle-life characteristics compared with the rechargeable lithium battery cells of Comparative Examples 1 and 2.

As used herein, expressions such as "at least one of" and "one of", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this disclosure has been described in connection with what is presently considered to be practical example embodiments, it is to be understood that the disclosure is not limited to the disclosed embodiments, but, on the contrary, is intended to cover various modifications and equivalent arrangements included within the spirit and scope of the appended claims and equivalents thereof.

DESCRIPTION OF SOME OF THE SYMBOLS

1: rechargeable lithium battery
2: positive electrode
3: negative electrode
4: separator
5: battery case
6: cap plate

What is claimed is:

1. A negative active material for a rechargeable lithium battery, comprising:
a carbon-based active material including highly crystalline natural graphite and artificial graphite, wherein the carbon-based active material has a peak intensity ratio (P2/P4) of 0.3 to 0.4, wherein P2 refers to a (101) peak intensity of a rhombohedral crystal grain and P4 refers to a (101) peak intensity of a hexagonal crystal grain, as measured by X-ray diffraction, and wherein the highly crystalline natural graphite is formed by heat-treating and surface oxidized, without a pitch coating, to form said highly crystalline natural graphite that is spherical.

2. The negative active material of claim 1, wherein the carbon-based active material has a peak intensity ratio (P3/P4) of about 0.18 to about 0.26, wherein P3 refers to a (012) peak intensity of a rhombohedral crystal grain, as measured by X-ray diffraction.

3. The negative active material of claim 1, wherein the highly crystalline natural graphite has a Raman R value ($I_D/I_G$) of 0.05 $I_D/I_G$ 0.08.

4. The negative active material for a rechargeable lithium battery of claim 1, wherein the negative active material further comprises a silicon-based active material.

5. The negative active material for a rechargeable lithium battery of claim 4, wherein the silicon-based active material is present in an amount of about 0.05 wt % to about 5 wt % based on the total amount of the negative active material for a rechargeable lithium battery.

6. A rechargeable lithium battery comprising:
  a current collector;
  a negative electrode including the negative active material of claim 1 on the current collector;
  a positive electrode facing the negative electrode; and
  an electrolyte between the negative electrode and the positive electrode.

7. The rechargeable lithium battery of claim 6, wherein the negative electrode has an active material layer density of greater than or equal to about 1.7 g/cc.

\* \* \* \* \*